S. A. WILLIAMS.
CURVED SURFACED BODY OF FIBER CEMENT CONCRETE, AND METHOD OF MOLDING IT.
APPLICATION FILED JUNE 9, 1921.
1,435,905. Patented Nov. 14, 1922.
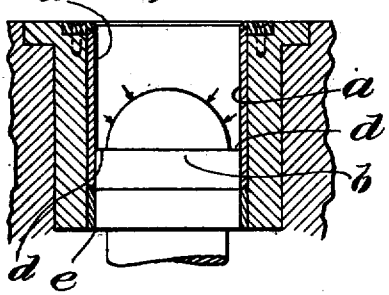
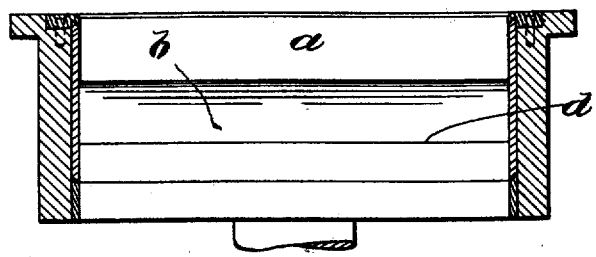
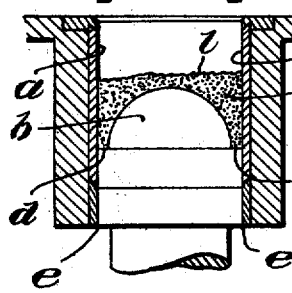
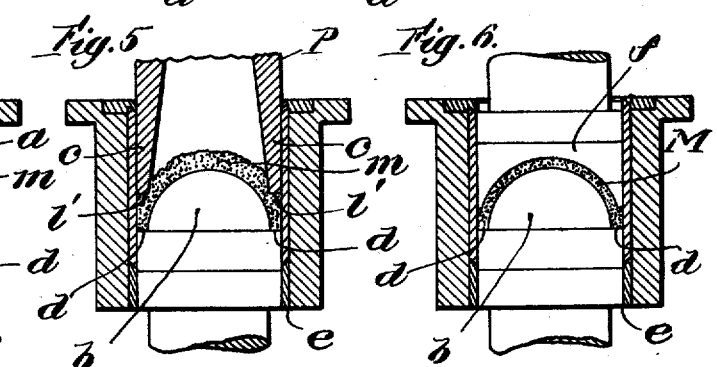
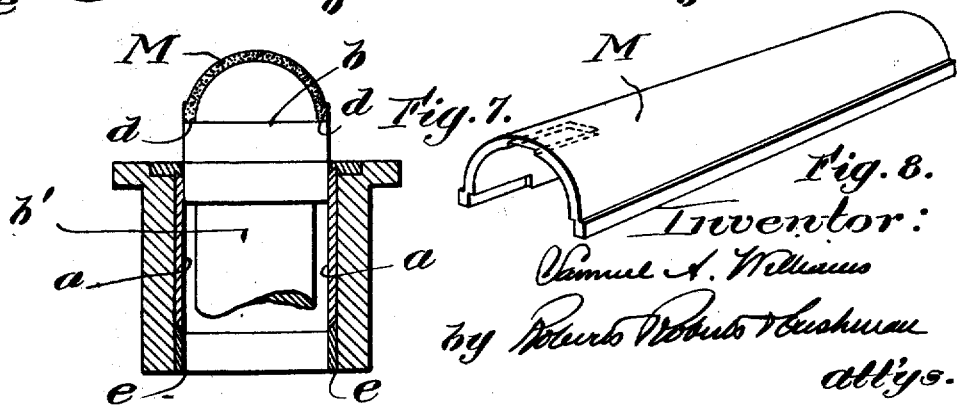

Patented Nov. 14, 1922.

1,435,905

UNITED STATES PATENT OFFICE.

SAMUEL A. WILLIAMS, OF LOCKPORT, NEW YORK.

CURVED SURFACED BODY OF FIBER-CEMENT CONCRETE AND METHOD OF MOLDING IT.

Application filed June 9, 1921. Serial No. 476,201.

*To all whom it may concern:*

Be it known that I, SAMUEL A. WILLIAMS, a subject of the King of Great Britain, and resident of Lockport, in the county of Niagara and State of New York, have invented new and useful Improvements in Curved Surfaced Bodies of Fiber-Cement Concrete and Methods of Molding Them, of which the following is a specification.

My invention relates to the art of forming pressure-molded articles of compounded fibrous and cementitious material, of which a mixture of short asbestos fiber, or asbestiform fiber produced by grinding serpentine with a hydraulic cement, such as Portland cement, is the type. High pressure is required to produce dense and structurally strong slabs, sheets or blocks of such material; usually this pressure is applied to a wet mixture of the fiber and cement in a filter press; the product immediately after the molding operation is pliable, and has to be supported until the cement has set. The product known as asbestos wood is made in this manner. Heretofore, when curved-surfaced products of this character have been required, sheets of the composite material, fresh from the press, and therefore flexible, have been bent over forms, and allowed to set in the shape thus imparted. Attempts to mold bodies of such material in curved-surfaced filter presses have not met with success; in order to preserve the desired curved form, the molded body had to remain in the press until set, and the intimacy with which the molded material clung to the perforated or reticulated filter press plate made it next to impossible to remove the molded body without injury to it, or to the filter bed, or both.

There is frequent need for curved shapes of material of this character, as for ridge-rolls which are used with asbestos shingle or tile, in roofing; and heretofore such trough-shaped bodies have been made by bending fresh or "green" composite asbestos fiber board over a form and allowing it to set in the shape imparted.

My invention has for its object the manufacture of curved-surfaced and concave-convex bodies of composite fiber and cement, represented by the asbestos fiber and hydraulic cement compositions, more expeditiously than formerly, and consists in a method of operation and an apparatus or mechanism by which the method can be performed and also in the product of the method. All will be herein described, and the method and product is herein claimed; the mechanism is the subject of claim in an application for United States Letters Patent filed by me concurrently herewith, serially numbered 476,202.

This method is applicable to the production of regularly or irregularly curbed bodies of cylindrical or spherical, or spheroidal or other curved surface. The mode of operation is best described with reference to a characteristic curvilinear cross section of the body to be molded, whether in three dimensions it be of cylindrical, spherical, or other curved surface.

In the drawings hereto annexed, which illustrate diagrammatically an apparatus with which my new method may be practiced, Fig. 1 shows a mold and bottom convex die, in cross section;

Fig. 2, the same in longitudinal section;

Fig. 3, the same in plan view;

Fig. 4, the mold, bottom convex die, and tamping plunger, in cross section;

Fig. 5, the same, with the tamping plunger in operation in the fiber-concrete material;

Fig. 6, the mold, bottom and top dies, and material after compression, all in cross section;

Fig. 7, the bottom die in its elevated position, and the molded body ready to be removed, in cross section; and Fig. 8, a molded product, in perspective.

Suppose, for example, that the material to be molded consists of thoroughly mixed asbestos fiber (or ground serpentine) Portland cement, and that quantity of water in which is the minimum requisite to set the cement, i. e., about fifteen per cent of the weight of the cement, and that the molding by pressure is to reduce the volume of the mixture to about one third of its bulk in the loose, and that the characteristic cross-section of the final molded body is semi-circular, as indicated at *m* in Fig. 6. This will be characteristic, whether the whole body be semi-cylindrical, or hemispherical, or conical, or conoidal, etc.

The mold comprises a box, with parallel vertical sides *a, a,* and a movable bottom mold or die *b*. Under the assumption above made for example, the formation of a body of curved cross section (see material *m*, Fig. 6) requires, theoretically, a compression normal at all points to the curve of the die b to reduce the bulk of material from the volume represented by the material m, Fig. 4 to that represented by the outline in section of the material m in Figs. 6 and 7. For obvious mechanical reasons, direct compression on normals represented by the arrows in Fig. 1 is impracticable. Indirectly and approximately, however, my method accomplishes the desired distribution and compression of material, and supplies practically and in a practical manner, the above indicated theoretical conditions.

With the sides a, a and bottom b of the mold in place as shown in Fig. 1, the composite of asbestos fiber, cement and water, thoroughly and intimately mixed, is charged into the mold to the level l (Fig. 4). This material is by no means watery, it feels only slightly moist to the hand, and is sufficiently plastic to hold a shape imparted to it by light pressure. First, a side tamping plunger P having sides c, c, is pressed down into the material m and condenses the material adjacent to the mold-sides a, a, in column between the lower ends of the tamping plunger sides c, c, and the ledges d, d, of the mold bottom. The tamping plunger is then withdrawn, leaving the material with a stepped outline, as indicated at line l', l', Fig. 5. Thereupon the final pressing head or upper die f is brought down on the material m (Fig. 6). The curved concave side of this die f, carries the middle portion of the material down, compressing it in a direction normal to the crown of the mold bottom b, and spreading material from the corners formed by the tamping plunger inward toward the center of curvature of the die surfaces, and downward toward the partly condensed material standing above the ledges d, d. The thin outer edges of the die f, which slide along the sides a, a, of the mold, increase the density of the preliminary compressed portions of the material m, and press it toward the mold bottom b, in a direction substantially normal to its surfaces adjacent to the ledges d, d. The material derived from the corner portions of this material, as formed by the tamping plunger, which is pressed downward toward the ledges d, d, increases the density of the material near and against these ledges. When full pressure is exerted on this molded material in the press, the molded body assumes such a sufficiently firm consistency that it can be handled and discharged from the mold, even before the cement in the material has had time to set. The preferred mode of discharge is illustrated in Fig. 7, where, the mold die f having been withdrawn, the mold-bottom b is raised by its shaft b' until the molded shape is clear of the sides a, a. Then the molded body M (Fig. 8) can be lifted from the mold-bottom b, and laid aside until the cement has set.

The mold bottom b, having a fairly close sliding fit with the mold sides, provides enough clearance at e, e, (Fig. 1) to allow for escape of air as the upper die f descends. Air will also escape between the die f and the mold-sides a, a.

By employing only so much water in the material which constitutes the fiber-cement concrete, as is necessary to set the cement, smooth and continuous mold surfaces can be employed, since no expression of water by filtration is necessary. The molded shape readily disengages itself from the smooth surfaces of the mold members.

Unlike curved shapes made by bending already compacted flat fiber concrete sheets, while in the moist or "green" state, over curved forms, the curved-surfaced body of fiber concrete made in accordance with the above described method is characterized by homogeneous density, and by uniform internal structural continuity. In contrast, forms or bodies made by bending green sheets of such material, are modified in structure by the bending, the fibers which function as reinforcements in the cementitious material are displaced both at the convex and concave portions of the final product, so that the internal structure of the material is degraded, especially in those portions where the fibers are pulled apart in the bending operation. Any attempt to form a thick walled concave-convex body of fiber concrete by the bending method incurs the danger of so far disrupting the originally uniform and continuous internal structure as to produce cracks or pits in the convex parts of the product.

I claim:

1. The method of molding fiber and cement concrete bodies in shapes characterized by curved cross-section, which comprises depositing the concrete-material over a convex mold-member, condensing the material at the sides of the convex mold member, and thereafter compressing the material in directions substantially normal to the convex mold-member.

2. The method of molding fiber and cement concrete bodies in shapes characterized by curved cross-section, which comprises forming a concrete mixture with substantially the proportion of water requisite to set the cement, depositing the concrete material over a convex mold-member, condensing the material at the sides of the convex mold member, and thereafter compressing the material in directions substantially normal to the convex mold-member.

3. The method of molding fiber and cement concrete bodies in shapes characterized by curved cross-section, which comprises depositing the concrete material over a convex mold-member, imparting a stepped conformation to the material by condensing portions thereof at the sides of the convex mold member, and thereafter changing said stepped conformation to curved conformation by pressure in resultant direction substantially normal to the convex mold-member.

4. The method of molding fiber and cement concrete bodies in shapes characterized by curved cross section, which comprises forming a concrete mixture with substantially the proportion of water requisite to set the cement, depositing the concrete material over a convex mold-member, imparting a stepped conformation to the material by condensing portions thereof at the sides of the convex mold-member, and thereafter changing said stepped conformation to curved conformation by pressure in resultant directions substantially normal to the convex mold-member.

5. Fiber-and-cement concrete pressure-compacted body, characterized by curved surfaces compressed to homogeneous density and internal homogeneous structural continuity by preliminary condensation of edge portions in a direction substantially tangential to the curvature of the body, and final condensation by pressure substantially normal to said curvature at all points.

6. Fiber-and-cement concrete pressure-compacted body, characterized by concavo convex form, compressed to homogeneous density and internal homogeneous structural continuity by preliminary condensation of edge portions in a direction substantially tangential to the curvature of the body, and final condensation by pressure substantially normal to said curvature at all points.

Signed by me at Boston, Massachusetts, this fourth day of June, 1921.

SAMUEL A. WILLIAMS.